United States Patent
Duckwall et al.

[15] 3,645,610
[45] Feb. 29, 1972

[54] OPHTHALMIC LENS SERIES

[72] Inventors: Frank E. Duckwall; Edward J. Labelle, both of Indianapolis, Ind.

[73] Assignee: Textron, Inc., Providence, R.I.

[22] Filed: May 18, 1970

[21] Appl. No.: 37,455

Related U.S. Application Data

[63] Continuation of Ser. No. 630,336, Apr., 1967, abandoned.

[52] U.S. Cl. ............................................. 351/159, 351/176
[51] Int. Cl. ........................................................... G02c 7/02
[58] Field of Search ................................. 351/159, 176, 177

[56] References Cited

UNITED STATES PATENTS 3,434,781  3/1969  Davis et al. ............................ 351/159

Primary Examiner—David H. Rubin
Attorney—Woodard, Weikart, Emhardt & Naughton

[57] ABSTRACT

A new and improved method of designing an ophthalmic lens series and a new and improved ophthalmic lens series. The method takes into consideration numerous factors affecting lens performance and by means of systematic calculations and graphical analysis provides the lens designer with a means for determining, for any given prescriptive power, the lens shape which will provide optimum visual acuity at angles of viewing up to 40° from the optical axis of the lens, simultaneously giving consideration to tangential and sagittal power errors, errors of astigmatism, variations in stop distance, ability of the eye to accommodate for certain errors, lens thickness, visual tasks of the wearer determined by statistical techniques, and many other factors. The lens series may cover the entire range of ophthalmic prescriptions and provides lenses having increased visual acuity over the whole area of the lens including angles of view up to 40° from the optical axis of the lens. A comparatively small number of groups of lenses are used, each group having one base curve identical for all lenses of the group.

1 Claims, 24 Drawing Figures

INVENTORS.
FRANK E. DUCKWALL and
BY EDWARD J. LABELLE

Woodard, Weikart, Emhardt & Naughton
Attorneys

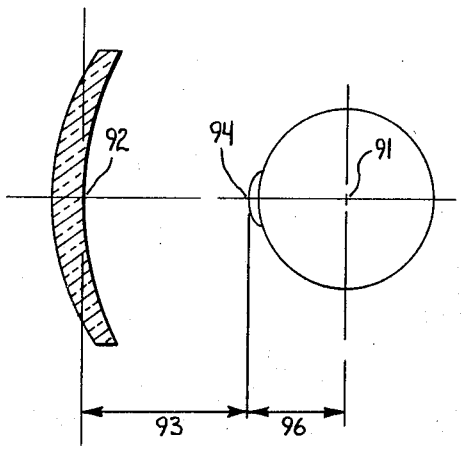
Fig. 10.
| SPHERE LENS POWER | VD (mm) | SCD (mm) | STOP DIST. (mm) |
|---|---|---|---|
| +8.00 | 13.7 | 12.8 | 26.5 |
| +6.00 | 14.4 | 13.1 | 27.5 |
| +4.00 | 15.1 | 13.4 | 28.5 |
| +2.00 | 15.6 | 13.7 | 29.3 |
| PLANO | 16.0 | 14.0 | 30.0 |
| -2.00 | 16.1 | 14.3 | 30.4 |
| -4.00 | 16.1 | 14.6 | 30.7 |
| -6.00 | 15.9 | 14.9 | 30.8 |
| -8.00 | 15.6 | 15.2 | 30.8 |
Fig. 11.
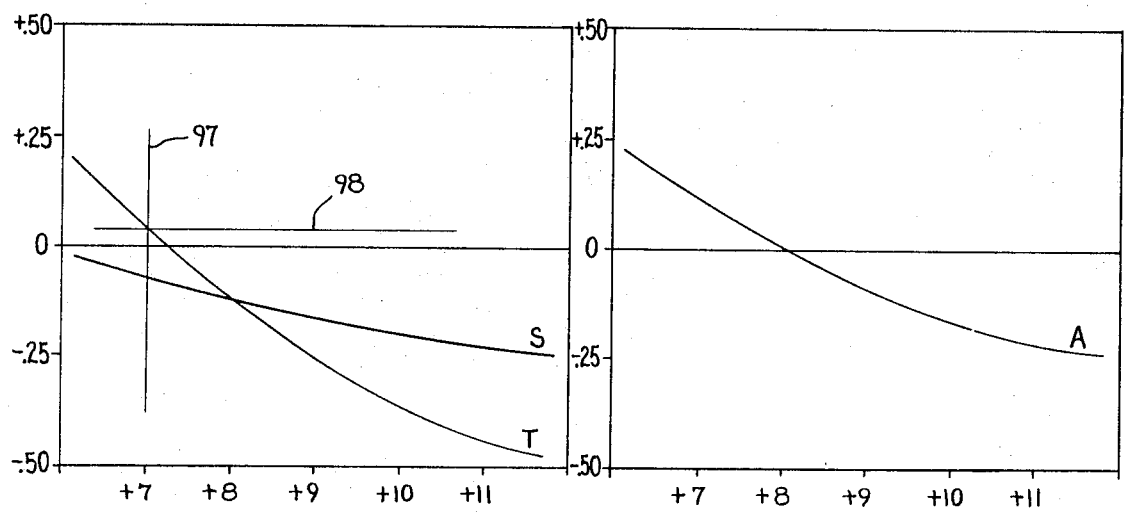
Fig. 12.          Fig. 13.
INVENTORS.
FRANK E. DUCKWALL and
BY EDWARD J. LABELLE
*Woodard, Weikart, Emhardt & Naughton*
Attorneys INVENTORS.
FRANK E. DUCKWALL and
EDWARD J. LABELLE
BY
Woodard, Weikart, Emhardt & Naughton
Attorneys

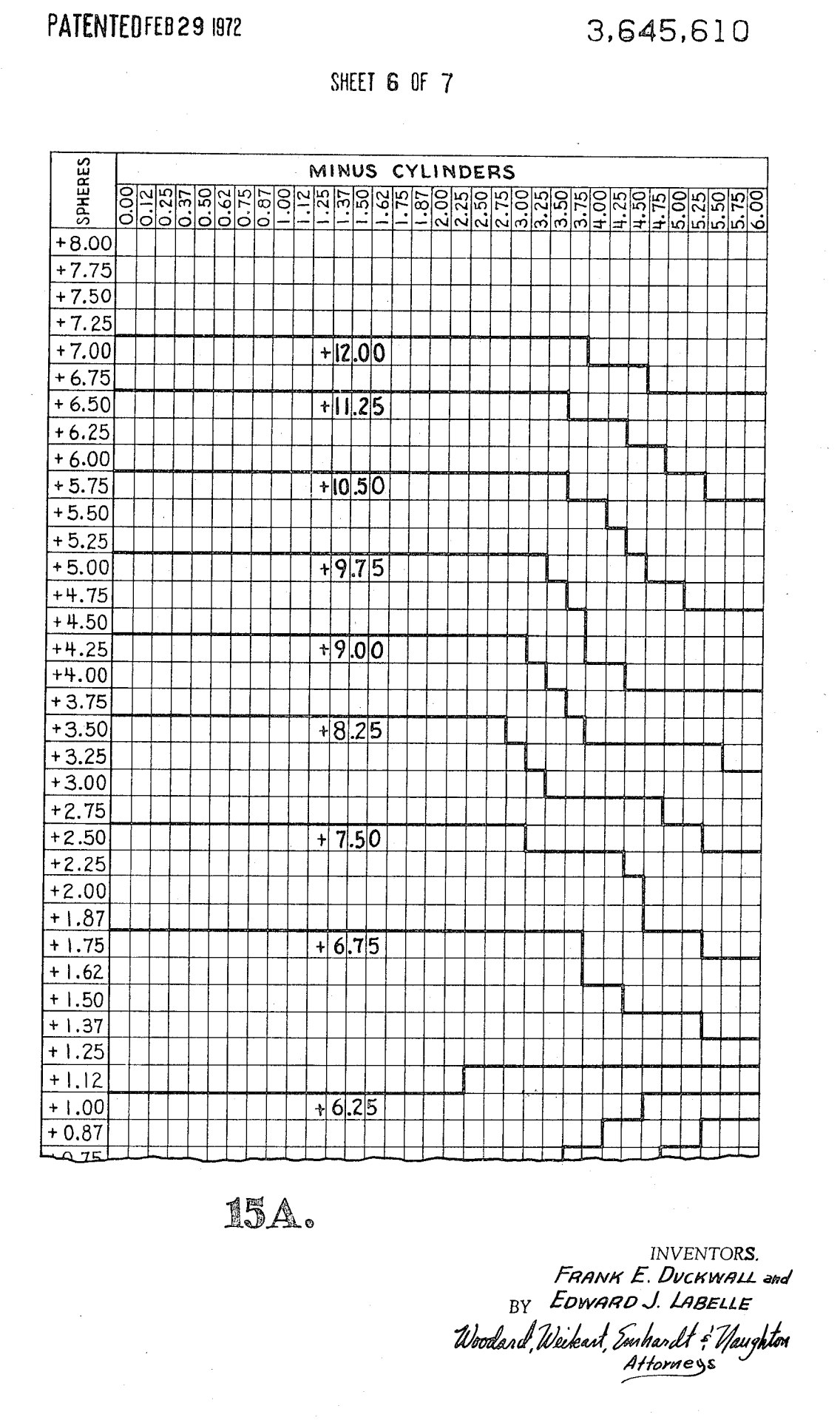

15A.

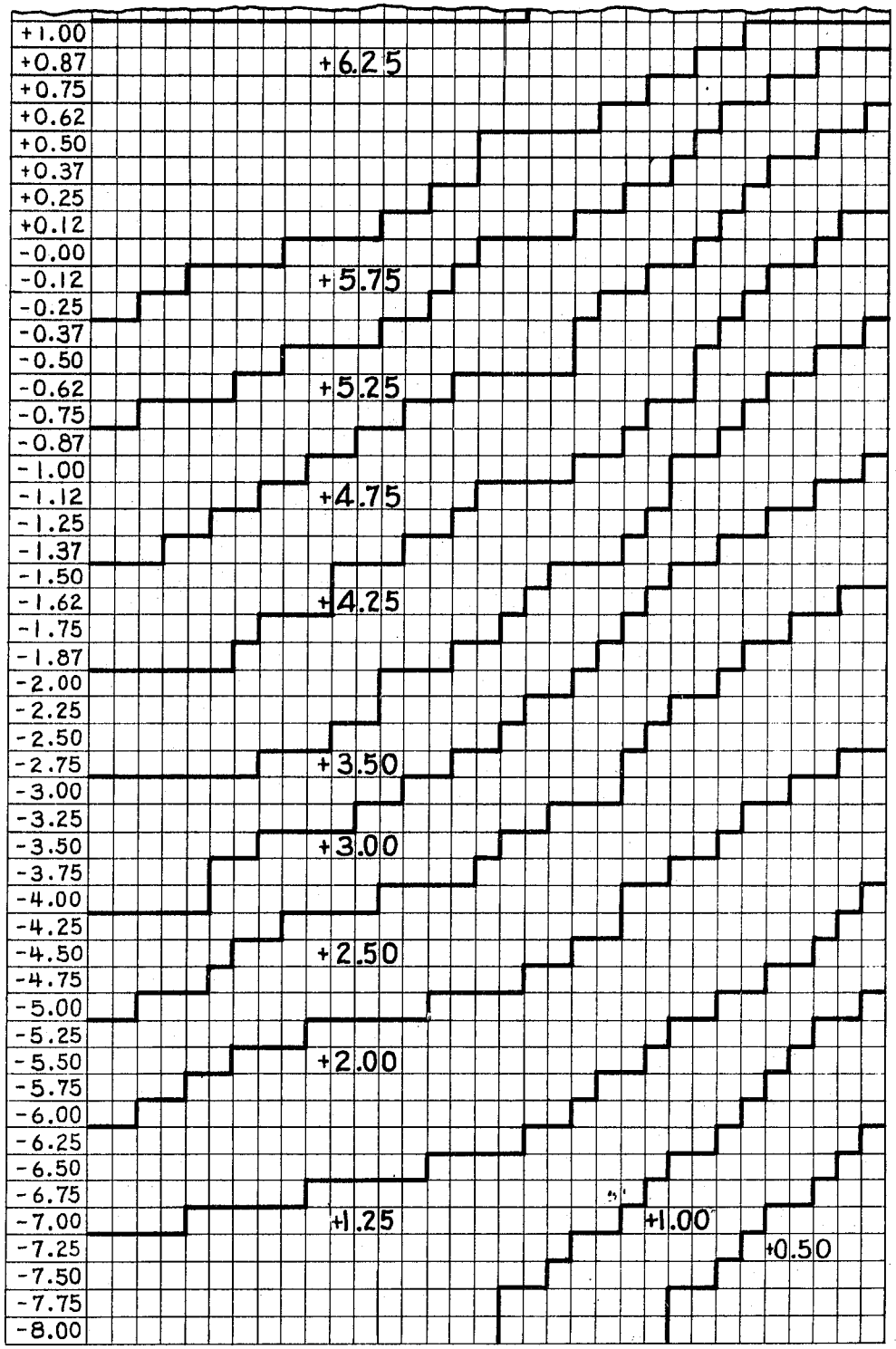
15B.

OPHTHALMIC LENS SERIES

CROSS-REFERENCE TO RELATED APPLICATION

This application is a continuation of application Ser. No. 630,336, filed Apr. 12, 1967, and now abandoned.

BACKGROUND OF THE INVENTION

1. Field of the Invention

The field of this invention is generally spectacles and eyeglasses, and more particularly concerns ophthalmic lenses and blanks, focus and/or astigmatism correction, and methods of accomplishing same.

2. Description of the Prior Art

The ophthalmic lens art dates back many years, but has only in the last half century achieved a measurable degree of sophistication. Modern lens theory may be said to date from 1911 when U.S. Pat. No. 989,645 was issued to Von Rohr. The Von Rohr patent is rather difficult to understand; it emphasizes correction for astigmatism, but gives no real discussion of design methods. In 1919, Hill et al., received U.S. Pat. 1,315,667, which considered both astigmatism and power change, and gave some consideration to a series of lenses having base curves. The 1922 U.S. Pat. to Gleichen, Nos. 1,438,820 and 1,438,821 introduced a design method based on the circle of least confusion.

The first comprehensive disclosure of a lens design method was given by Tillyer in U.S. Pat. No. 1,588,559, where he discusses how lenses are computed, what ideas are involved, and shows some graphical methods useful in design work. Soon afterward, Rayton disclosed in U.S. Pat. No. 1,715,784 for the first time in a patent the idea of a series of groups of lenses, each group having a base curve, however his design criteria covered only astigmatism. Rayton received another U.S. Pat. No. 1,745,641 in 1930 which covered correcting for astigmatism for an intermediate distance, for example 26 inches, as a compromise, so that his lenses would be approximately corrected for near and distance vision, but again Rayton gave no consideration to power errors.

In 1935, Sterling in U.S. Pat. No. 2,021,812 more fully developed the idea of the multibase lens series, but was primarily concerned with lens appearance, or as he describes it, "coflexure," between adjacent groups of lenses.

In 1942, Tillyer, who had been a coinventor with Hill in U.S. Pat. No. 1,315,667, received U.S. Pat. No. 2,391,045 which ties in closely with the Hill et al., patent. The same general ideas are involved as to making a compromised correction between astigmatism and power change. The idea that the distance to the center of rotation of the eye which enters into the calculations should be varied according to the power of the lens is introduced. It had been established at this time by independent investigators that this distance does vary.

Each of the above-cited references has provided a solution for the problem of lens design within a somewhat limited area. None of them have given full or adequate consideration to the actual functioning or physiology of the eye, or to the range of visual tasks performed by the eye. A major problem which has persisted for many years, and one which the present invention solves, is that of providing a design method and a lens series which gives proper consideration to the actual functioning of the eye.

SUMMARY

The invention is a new and improved method of designing ophthalmic lenses, and a new and improved ophthalmic lens series. The method of this invention incorporates many calculations and some steps which are well known in the art, however it simultaneously considers more factors than any method of the prior art, presents the results of many calculations in a graphical form which facilitates the final selection of the specific shape for a given lens, and interprets both calculated quantities and graphical data in the light of actual physiological functioning of the eye.

Prior art lenses have often favored the reduction of power errors at the expense of increased astigmatism. The present method, on the other hand, takes into consideration the ability of the eye to accommodate for certain power errors, and accordingly provides lenses which have lower marginal errors of astigmatism while allowing certain power errors to increase within limits wherein the eye can accommodate, thereby producing lenses of better marginal visual acuity than any of the prior art methods of design.

In the present method, calculations of tangential and sagittal power errors and astigmatism are made for a large number of prescriptive powers for both near vision at 14 inches and distance vision, at angles of 20°, 30° and 40° from the optical axis, consideration being given to variable stop distance, pantoscopic tilt, relative effects of astigmatic as opposed to power errors, and the ability of the eye to accommodate for certain power errors.

The lens series of the present invention may provide lenses for the entire range of prescriptive powers and having improved visual acuity for very wide angles of viewing—up to 40° from the optical axis—and does so with the use of a comparatively small number of lens groups, each group having a base curve common to each lens of the group.

BRIEF DESCRIPTION OF THE DRAWINGS

FIG. 10 is a diagrammatic representation of an eye and an ophthalmic lens showing the vertex distance, sighting center distance, and stop distance.

FIG. 11 is a table showing the variations of vertex distance, sighting center distance, and stop distance with spherical prescriptive lens power.

FIG. 12 is a graph showing the variation with lens shape of the tangential and sagittal power errors of a positive power spherical lens for near vision, and the effects thereon of accommodation of the eye.

FIG. 13 is a graph of astigmatism showing how the tangential and sagittal error curves of FIG. 12 may be replaced with a single astigmatic error curve for near vision analysis.

FIGS. 15A and 15B are a table showing a representative layout of the ophthalmic lens series of the present invention.

DESCRIPTION OF THE PREFERRED EMBODIMENTS

Figure 1:
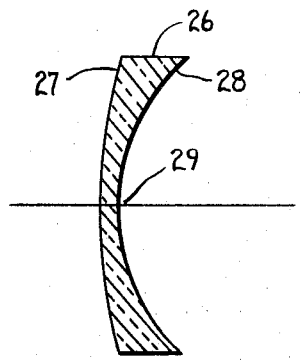
FIG. 1 is a cross-sectional view of a typical negative power spherical lens.

It is well known in the art that the power of an ophthalmic lens is a function of the index of refraction of the lens material and the curvature of the optical surfaces of the lens. The conventional unit of lens or surface power is the diopter (D). Each surface of a lens has a measurable power at every point in the surface, which may be either positive or negative. By convention, convex surfaces produce positive powers, and concave surfaces produce negative powers. The power of a lens at any given point is approximately equal to the algebraic sum of the powers of its two optical surfaces at that point. This is illustrated in FIG. 1 which shows a lens 26 with a convex surface 27 and a concave surface 28. If, at the point 29, the convex surface 27 has a power of +5.00D and the concave surface 28 has a power of −7.00D, then the approximate power of the lens 26 at the point 29 is the algebraic sum, (+5.00D)+(−7.00D)=−2.00D.

Figure 2:
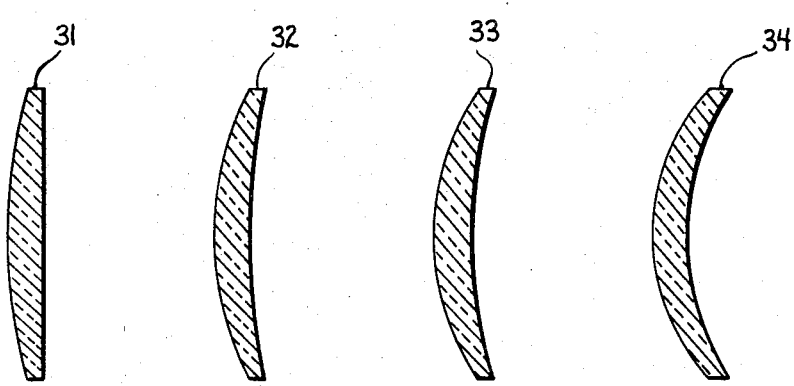
FIG. 2 is a cross-sectional view of four spherical lenses each having the same vertex power.

Because the power of a lens is approximately equal to the algebraic sum of the powers of its two surfaces, it will be readily seen that for a lens of any given power, there are an infinite number of possible shapes, some flatter and some more curved in overall appearance. This is illustrated in FIG. 2 which shows four lenses, each having a vertex power of +4.00D. The first of the lenses 31, has a +4.00D surface on the left and a 0.00D or plano surface on the right. The second lens 32, has a +6.00D surface on the left and a −2.00D surface on the right. Similarly, the lens 33 has surfaces of +8.00D and −4.00D and the lens 34 has surfaces of +10.00D and −6.00D.

Lens surfaces are generally three dimensional. For this reason, it is convenient, as it is generally in the fields of physics and mathematics, to describe qualities and quantities with reference to a coordinate system. The conventional coordinate system of the ophthalmic lens art consists of two orthogonal coordinate planes, the first of which is defined by the point on the lens under consideration and the optical axis of the lens and the second of which is defined as a plane perpendicular to the first plane and intersecting the first plane along the normal to the curve formed by the intersection of the first plane and the surface of the lens at the point under consideration.

The curvature of the line formed by the intersection of the first coordinate plane and the surface of the lens is referred to as the tangential curvature of the surface and the curvature of the line formed by the intersection of the second coordinate plane and the surface of the lens is referred to as the sagittal curvature of the surface.

Figure 3:
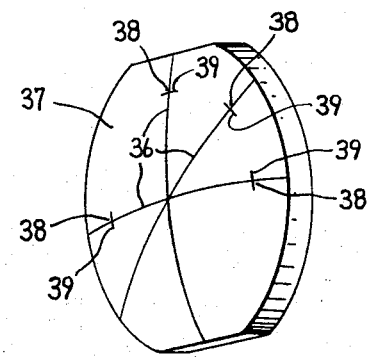
FIG. 3 is a perspective view of a ophthalmic lens showing the convex surface of the lens and illustrating the orientation of the tangential and sagittal curvature.

This choice of a coordinate system is most helpful in understanding ophthalmic lens theory and in performing mathematical calculations concerning ophthalmic lenses. Referring now to FIG. 3, the lines 36 represent lines formed by the intersection of the first coordinate plane with the surface 37 of the lens and are therefore representations of the tangential curvature of the surface 37 of the lens. The lines 39 represent portions of the lines formed by the intersection of the second coordinate plane and the surface 37 of the lens at the points 38 and are therefore representations of the sagittal curvature of the surface 37 at the points 38.

As mentioned earlier, for any lens material of given refractive index, lens power is a function of surface curvature. Lens power is also a function of lens thickness and the angle of incidence of light striking the lens. These quantities are readily expressed in power notation. For this reason, power is a more convenient unit with which to work than is curvature or radius of curvature; therefore, curvatures are described indirectly in terms of power, measured in diopters. Combining this notation with the above described coordinate system permits the power of a lens at any point to be completely and conveniently described in terms of the tangential power and sagittal power at the point, the thickness of the lens and the angle of incidence. Specific examples referred to and incorporated below are for lenses formed of crown optical glass having an index of refraction of 1.523, but it should be understood that the design method and lens series of this invention apply equally to other materials of different refractive index.

Although it is customary in the art to describe the power of a lens generally in terms of its vertex power, it is well known that the power of a lens at any point removed from the vertex may vary considerably from the vertex power of the lens due to variation in thickness and angle of incidence. These deviations are referred to as oblique or marginal power errors, and are readily described in terms of their tangential and sagittal components as described above.

It is common usage in the art to refer to a surface in terms of its characteristic curve or curves. Therefore, a spherical surface having tangential and sagittal curves of 1.00D is called a 1.00D curve. This usage is helpful when referring to cylinder or toric lenses wherein a surface has two characteristic curves, for example, a −7.00D curve in the cylinder meridian and a −5.00D curve in the sphere meridian. This terminology will be used throughout this application. Cylinder lenses will be discussed in detail later.

It is also well known that marginal power errors are greater in some shapes of lenses than in others. This is well illustrated in FIG. 4, which is a graph of the tangential and sagittal power errors for a wide range of spherical lenses having a vertex power of +2.00D. To arrive at the graph of FIG. 4, a plurality of curves were calculated. These curves were then paired to define a plurality of lenses, each having a vertex power of +2.00D. The tangential and sagittal powers of these lenses (of which FIG. 2 is representative) having a vertex power of +2.00D were calculated by methods known in the art. From each of the calculated powers the vertex power was subtracted and the resulting tangential (T) and sagittal (S) power errors plotted against the vertex power of the convex surface of the particular lens. The errors might also have been plotted against the concave curve values, or in the case of cylinder lenses, to be described subsequently, against the curves of one of the major meridians. Positive values indicate that the calculated power was greater than the vertex power while negative values indicate that the calculated power was less than the vertex power. The particular calculations which are graphed in FIG. 4 were made at points 40° from the optical axis using a stop distance of 29.5 milimeters.

Figure 4:
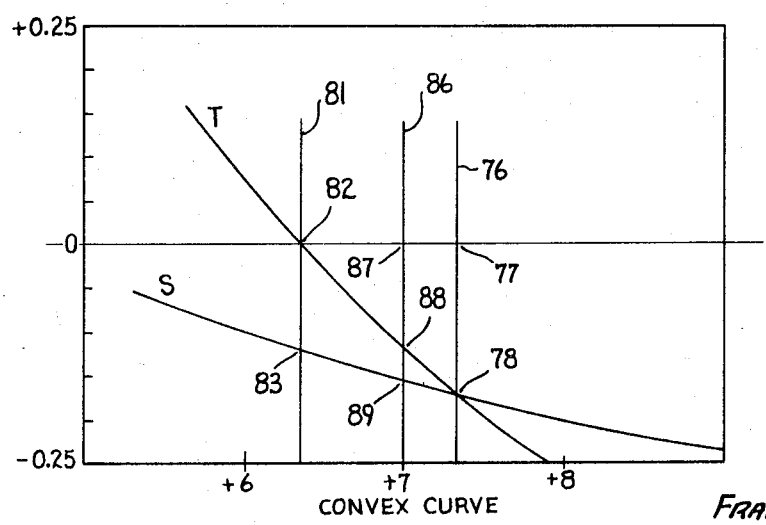
FIG. 4 is a graph showing the variation of tangential and sagittal power errors for a +2.00 D spherical lens as the shape of the lens is varied.
Figure 5:
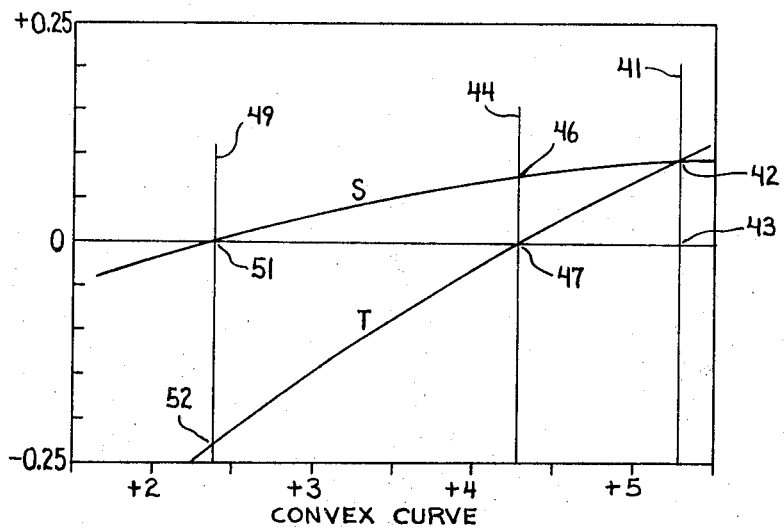
FIG. 5 is a graph showing the variation of tangential and sagittal power errors for a −2.50 D spherical lens as the shape of the lens is varied.

The graph of FIG. 4 shows the characteristic variation of the tangential and sagittal errors for positive power lenses as the shape of the lens is varied. Both the tangential and sagittal errors for positive power lenses become more negative as the shape of the lens is made more curved, the tangential error changing more rapidly than the sagittal error. By way of comparison, FIG. 5 shows a similar graph for −2.50D spherical lenses, which shows the characteristic variation of the marginal errors for a negative power lens. The particular calculations which are graphed in FIG. 5 were made at points 30° from the optical axis using a stop distance of 30.5 milimeters.

Near the vertex, marginal power errors are negligible or nonexistant. For this reason, any of the lenses for which calculations were made and plotted in FIG. 4 or FIG. 5 would probably be satisfactory for vision through the vertex of the lens. However, as the eye rotates about an approximate center of rotation for oblique vision, marginal errors cause blurring to occur. It is well known in the art that this blurring is due not only to the absolute magnitudes of the tangential and sagittal power errors, but also to the magnitude of the difference between the tangential and sagittal powers. This difference between the tangential and sagittal powers is referred to as astigmatism or astigmatic error, and is represented in FIGS. 4 and 5 by the vertical distance between the S and T curves. In relation to eye accommodation, which will be described below, it is convenient to refer to the "power error" of a lens rather than to both the tangential and sagittal power errors. Therefore, the present method defines the power error as the lesser of the tangential or sagittal powers for any given shape lens. Because of the general relationship between the tangential and sagittal power errors, as can be seen in FIGS. 4 and 5, the tangential error will be the lesser in the range of interest on each graph. Therefore, wherever reference is made to the "power error" of a lens, it should be taken also to mean the tangential power error. Additional support for this position will be given below.

As will be seen by reference to FIGS. 4 and 5, choosing the best shape for a given prescriptive power lens is considerably more complex than merely choosing the shape for which one of the marginal errors is zero. For example, for the −2.50D spherical lenses graphed in FIG. 5, the lens shape having no astigmatic error, indicated by the vertical line 41, has a nominal +5.25D convex curve. The tangential and sagittal power errors for this shape lens, however, are each 0.10D (represented by the distance from point 42 to point 43). For the lens shape where the tangential power error is zero, indicated by the vertical line 44, there is an astigmatic error of 0.07D (represented by the distance between points 46 and 47), and for the lens shape where the sagittal power error is zero, indicated by the vertical line 49, there is an astigmatic error of −0.22D (represented by the distance between points 51 and 52). There is no possible combination of curves which will reduce all the marginal errors to zero simultaneously. It should be noted that the graphs of FIGS. 4 and 5 are only for points a certain distance from the optical axis. That particular shape which reduces an error to zero at one distance from the optical axis will not generally reduce that same error to zero at a different distance from the optical axis. One of the problems presented, therefore, and which this invention solves, is that of selecting the combination of curves for a lens of given prescriptive power which optimizes visual acuity over the whole area of the lens.

Theoretically each individual prescriptive power lens should have a different combination of curves. Practically at least, some grouping is necessary. Therefore, a complete layout covering the range of ophthalmic prescriptions will ordinarily consist of a lens series having a number of stepped off groups. Within each group, one curve is common to all of the lenses, and is denominated the base curve for that group. This base curve may be on either the convex or the concave side. In the case of cylinder or toric lenses, to be described subsequently, the base curve may even be located in just one meridian of one surface of the lens. In other words, any of the characteristic curves may be chosen as the base curve and its selection determines the other curves.

Accordingly, another of the problems presented, and for which this invention provides a solution, is the selection of the optimum number of base curves to cover the range of usual ophthalmic prescriptions and the precise shape of each base curve.

Figure 6:
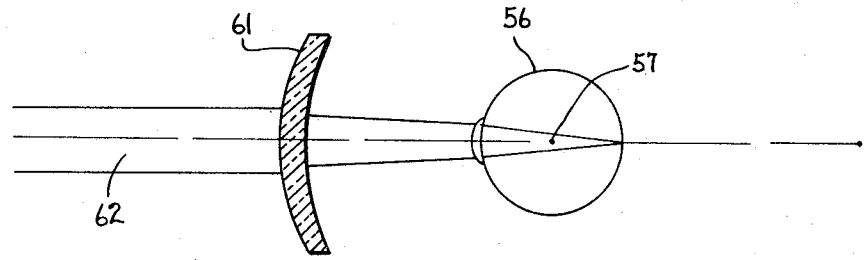
FIG. 6 is a somewhat diagrammatic cross sectional representation of an eye and an ophthalmic lens.
Figure 7:
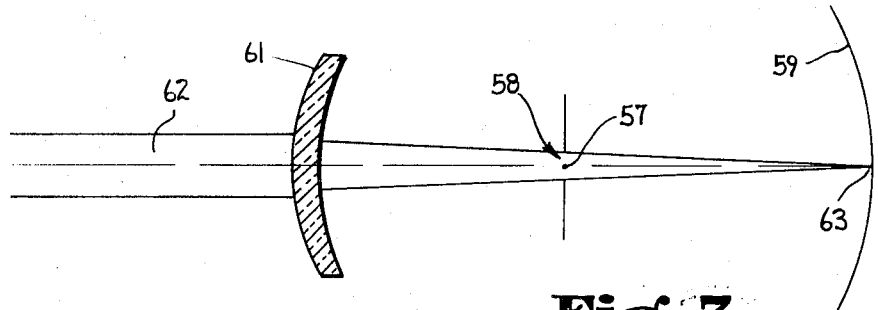
FIG. 7 is a somewhat diagrammatic cross sectional representation of an ophthalmic lens showing the aperture and far point sphere used in lens design calculations.

In the design method of the present invention, the human eye 56 having a center of rotation 57 shown in FIG. 6 is replaced by an aperture 58 and the far point sphere 59 of FIG. 7. This is a technique well known in the art, and serves to simplify the mathematical calculations by eliminating the eye per se from the calculation. Without describing the calculations, it is sufficient to point out that the far point sphere 59 is the surface wherein the proper prescriptive lens 61 for the eye 56 will bring a pencil of parallel rays of light 62 to pointfocus 63. The technique is equally valid for negative power lenses which diverge rather than converge, use being made of a projection through the lens.

Figure 8:
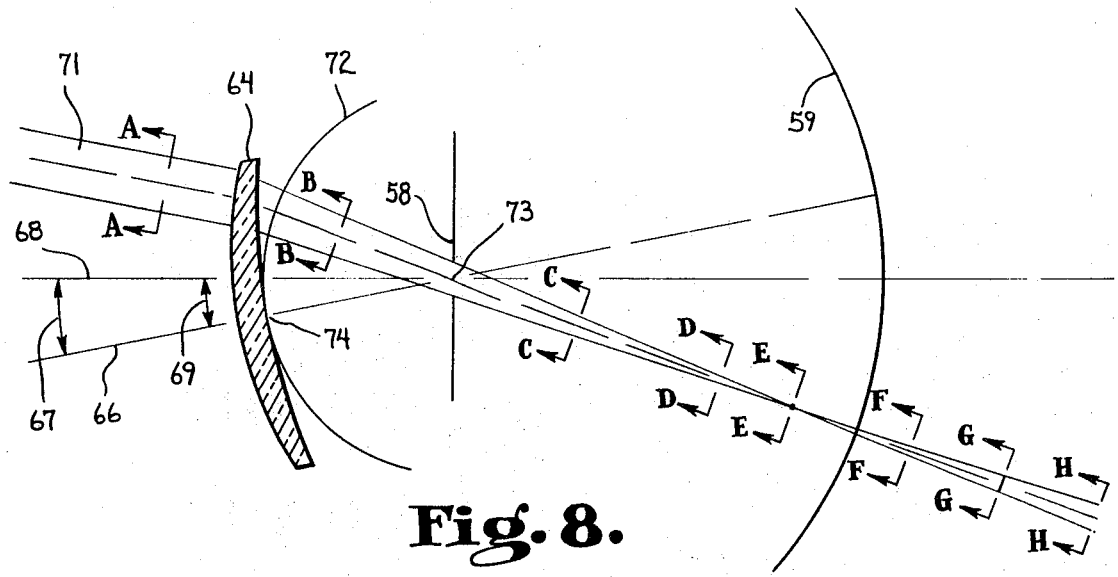
FIG. 8 is a further diagrammatic representation of an ophthalmic lens illustrating pantoscopic tilt and the effects of tangential and sagittal power.
Figure 8A:
FIGS. 8A–8H are cross-sectional views taken along the respectively lettered lines of FIG. 8.
Figure 8B:
Figure 8C:
Figure 8D:
Figure 8E:
Figure 8F:
Figure 8G:
Figure 8H:

In the diagram of FIG. 8 the lens 64 is shown with pantoscopic tilt as it would be worn. The optical axis 66 is inclined at an angle 67 from the horizontal 68 and the lens 64 is decentered an amount 69 downwardly. Generally the angle 67 is approximately 10° and the amount 69 of decentering is approximately 5 millimeters The matter of pantoscopic tilt and decentering will be considered below in more detail.

Ideally, a pencil of parallel rays 71 should come to pointfocus 63 on the far point sphere 59. This is substantially achievable for rays 62 passing through the lens at or very near the vertex as depicted in FIG. 7. However, in general, the nearest approach to pointfocus consists of two lines, the so-called tangential (T) line and the sagittal (S) line, which may assume various positions with respect to the far point sphere. As viewed in FIG. 8, the S-line is in the plane of the paper and the T-line is perpendicular to the paper. The several cross-sectional views of FIGS. 8A through 8H show the relative dimensions of the pencil of rays 71 at numerous points. In the particular configuration of FIG. 8, the S line is in the plane of the paper and the T line is perpendicular thereto. This is true only when the marginal area of the lens being considered is directly above or below the optical axis. This S line is always radial to the optical axis and lies in the first coordinate plane described above. The T line is always perpendicular to the S line and thus lies in the second coordinate plane. Therefore, if a marginal area of the lens at 45° upwardly and rightwardly from the optical axis (as viewed by the wearer) were being considered, each of the sectional views of FIGS. 8A through 8H would be rotated 45° clockwise to present the true relationship with the vertical. Similarly, if the marginal area under consideration were horizontally rightwardly of the optical axis, each of the sectional views of FIGS. 8A through 8H would be rotated 90° clockwise.

Also shown in FIG. 8 is the vertex sphere 72 which is an imaginary sphere having its center at the center of rotation 73 and a radius equal to the stop distance which will be described in detail subsequently. All calculations of tangential and sagittal powers are made with respect to the vertex sphere as a reference by techniques which are well known in the art.

It should also be noted that the vergence of the T-line (which lies in the second coordinate plane) is due to the tangential power of the lens (measured in the first coordinate plane) and the vergence of the S-line (which lies in the first coordinate plane) is due to the sagittal power of the lens (measured in the second coordinate plane).

In the configuration of FIG. 8, the tangential power in the marginal area under consideration is greater than the sagittal power. Therefore, the T-line is converged closer to the lens than is the S-line. This difference in power in the two coordinate planes results in the generally elliptical cross section of the pencil of rays 71 after passing through the lens as illustrated in the sectional views of FIGS. 8A through 8H, and produces the marginal astigmatic error. For various shape lenses, the S-line and T-line may be brought to focus both in front of the far point sphere, both behind the far point sphere, or one on either side of the far point sphere. The ideal lens, of course, would bring both lines to pointfocus on the far point sphere for all marginal areas of the lens.

As stated above, the ideal lens physically cannot be achieved, and the process of selecting the optimum shape lens is quite complex. This complexity is multiplied in the design of toric or cylinder lenses, where at least two, and possibly additional meridians must be considered. Pantoscopic tilt and other fitting problems enter in. Lateral chromatic aberration is a factor. The list of errors is large, and the principal idea of the present invention is to consider all of these simultaneously, to strike a balance between them, and to achieve the best possible correction for all of them.

In the method of the present invention, numerical calculations are made of a large number of lenses having individual prescriptive powers and the results graphed. FIGS. 4 and 5 are representative of these graphs. It should be emphasized that one of the principal innovations of the present method is to provide a more complete graphing method than has been used before. The graphs of FIGS. 4 and 5 are somewhat simplified examples to bring out the development of the present method.

The disclosure up to this point has been primarily concerned with describing the method of the present invention with respect to spherical lenses. The design method is equally applicable to cylinder (more appropriately spherocylindrical) or toric lenses, to which reference has been made. A cylinder lens is one which has at least one toric surface and is designed to correct for astigmatism of the eye. The difference in power of the curves in the two major meridians of a toric surface is referred to as the cylinder power and, like spherical power, is measured in diopters. The toric surface may be placed on either the concave or the convex side of the lens. When placed on the convex side of the lens, the lens is referred to either as a plus cylinder lens or a positive toric lens. When placed on the concave side of the lens, the lens is referred to either as a minus cylinder lens or a negative toric lens. The former of each of these terms will be used throughout this disclosure.

The two major meridians of a cylinder lens are denominated the sphere meridian and the cylinder meridian. They are oriented at right angles to each other, but are not necessarily vertical and horizontal. At points intermediate the major meridians, the power of the lens falls between the major meridian powers.

Figure 9:
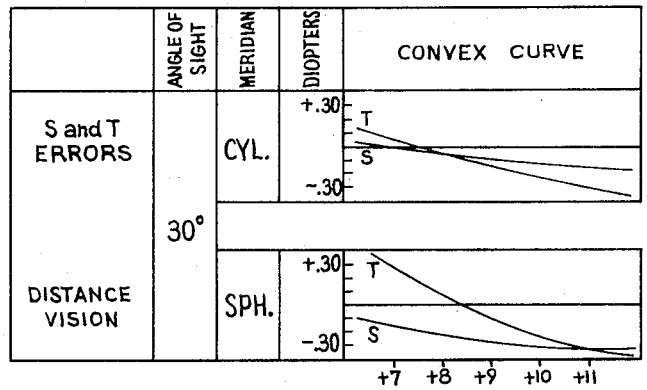
FIG. 9 is a pair of graphs of tangential and sagittal power errors for a cylinder lens.

Because a spherical lens is symmetrical about the optical axis, a single point at any given distance from the optical axis is sufficient to describe the tangential and sagittal errors of the lens for that viewing angle. For a cylinder lens, however, because the curvature is different in different meridians, one point is insufficient. At least two points, one in the sphere meridian and one in the cylinder meridian, are necessary to fully describe the lens. According to the design method of the present invention, instead of preparing only one graph for each viewing angle such as that of FIG. 4, which is sufficient for a spherical lens, two graphs are prepared as illustrated in FIG. 9; one for the sphere meridian (labeled Sph.) and one for the cylinder meridian (labeled Cyl.). It should be understood that the present method is not limited to only two graphs for a cylinder lens. In some cases it may be desirable to construct graphs for meridians intermediate the two major meridians, in which cases all the steps of the present method are equally applicable.

The present design method, although equally applicable to plus cylinder lenses, will be described with reference to minus cylinder lenses.

Another innovation of the present method is that of giving more weight to power errors than to errors of astigmatism. In the prior art, generally more weight has been given to astigmatism than to power errors. Based upon recent studies of loss of visual acuity for lens errors, both spheres and cylinders, a lesser effect is indicated for cylinder power than the same amount of spherical power. The effect upon loss of visual acuity for a given cylinder power is in the range of 60 percent to 80 percent of the effect for the same magnitude spherical power. In the present method a factor of 70 percent has been adopted, but it should be understood that this value may be slightly increased or decreased without departing from the innovation of the present invention. The significance of this innovation is that it incorporates the actual response of the eye more than any of the prior art methods, providing more correction for an error which has a greater effect on visual acuity at the expense of allowing an increase in an error which has a lesser effect on visual acuity at the expense of allowing an increase in an error which has a lesser effect on visual acuity.

Frequent reference has been made above to the eye's ability to accommodate. One of the novel approaches in the method of the present invention is to give proper consideration to the effects of accommodation of the eye. None of the previous lens designs have given full or correct attention to this complex subject.

When the normal eye is focused on a distant object, it is in a state of relaxed accommodation. When an eye requiring some correction is fitted with the proper corrective lens, it is assumed to be in a state of relaxed accommodation when focused on a distant object. Of course, nobody can be certain that the degree of correction is such that the eye is in a state of relaxed accommodation, but on the average it would be true, and this is the only reasonable basis upon which to proceed. Therefore, when the marginal power errors are positive, that is to say when the S and T curves on the graphs of FIGS. 4 and 5, for example, are above the horizontal axis, the eye cannot be expected to accommodate, for to do so would require further relaxed accommodation, of which the eye is incapable.

For minus errors, indicated in the graphs of FIGS. 4 and 5, for example, where the S and T curves are below the horizontal axis, the eye can accommodate, because accommodation in this direction requires the eye muscles to perform substantially the same muscular movements that occur when the eye focuses on a near object. Whether the eye of any particular person will, in fact, accommodate, is not a foregone conclusion as the investigations have shown. Also there is a time factor involved. It has been shown that accommodation takes a sizable part of a second. Thus for very quick excursions of the eye there may not be time to accommodate. On the other hand, it is reasonable to assume that when detailed vision is desired the eye will hesitate long enough to accommodate.

In the design method of the present invention, base curves are chosen upon the basis that the eye cannot accommodate for plus errors. For minus errors a point is chosen on the graphs between the curve which would be better if the eye accommodated and that which would be better if the eye did not accommodate, but with more weight being given to the idea that the eye will accommodate. Referring again to FIG. 4, at a +7.37D convex curve (represented by the vertical line 76) the S and T-lines cross, indicating no astigmatism at 40° from the optical axis for distance vision for this shape lens. This particular shape lens would be the best choice if it were certain that the eye would accommodate, because the eye could overcome the −0.17D power change at this point (represented by the distance between the points 77 and 78 on the vertical line 76). At approximately a +6.37D convex curve (represented by the vertical line 81) where the T-line crosses the axis (at 82) there would be no tangential power error, but the S and T-lines have a vertical separation at this point of 0.12D (the distance between the points 82 and 83), which represents astigmatism. Applying the 70 percent factor discussed above to this amount of astigmatism reduces the value to 0.08D, a more accurate representation of the actual affect on the eye. A +6.37D convex curve would be the best choice if it were certain that no accommodation would take place. Given, however, the premise that the eye will accommodate, at least in many cases, an in-between value is the optimum choice lens shape, in this case a shape having a +7.00D convex curve. It will be seen that for a +7.00D convex curve (represented by the vertical line 86) there is a power error of −0.12D (represented by the vertical distance from the point 88 to the point 87) and there is astigmatism of 0.05D (represented by the vertical distance between the points 88 and 89 on the T and S-lines respectively). This 0.05D of astigmatism, applying the 0.7 factor, has an astigmatic effect of 0.05D×0.7=0.035D. It should be emphasized that the lens shape having a +7.00D convex curve is the choice for just the conditions of the graph of FIG. 4; that is, +2.00D spherical prescriptive power distance vision, 40° from the optical axis. In the final design it will be balanced with other seeing conditions and may not be the final curve selection for the +2.00D spherical prescriptive power lens.

In the graph of FIG. 5 for −2.50D prescriptive power lenses, it can be seen that the S and T-lines intersect where the convex curve has a value of +5.25D (indicated by the vertical line 41). For this shape lens, however, there is a power error of +0.10D (indicated by the distance between the points 42 and 43). Since this is a positive error, and since the design method of this invention presumes the eye incapable of accommodating for positive errors, this shape is unsuitable. In fact, all shapes to the right of +4.25D convex curve (indicated by the line 44) are unsuitable because the power errors there are positive. Therefore, the farthest right point on the graph of FIG. 5 having values acceptable to the present design method is the point 47 where the T line crosses the horizontal axis, that is, a lens with a convex curve of +4.25D. At this point, according to the criteria of the present method, there is no power error, however there is an astigmatic error of 0.07D (indicated by the distance between points 46 and 47). Moving leftwardly from the point 47 the T-line becomes more negative, and, as has already been pointed out, the eye is presumed capable of accommodating for negative power errors. However, close inspection of FIG. 5 reveals that moving leftwardly from the point 47 also acts to considerably increase the astigmatic error. Thus, a spherical lens having a +4.25D convex curve is the best choice for the stated conditions; that is, −2.50D spherical prescriptive power lens, distance vision, 30° from the optical axis. In the final design it will be balanced with other seeing conditions and may not be the final curve selection for the lens of this power.

The above-described method of interpreting the graphs and selecting curves is basic to the present design. It differs from anything in the prior art, and is one of the major contributions of the present invention. A study of FIGS. 4 and 5 in light of the foregoing shows that the tentative curve selection will lie within the range of curves including the curves where power error is zero and where astigmatism is zero, but in no case where the power error is negative for negative power lenses or where the power error is positive for positive power lenses.

Reference has been made above in connection with FIGS. 4 and 5 to stop distance. Stop distance is related to a number of factors and provides the lens designer with a convenient design dimension. Referring now to FIG. 10, stop distance is the distance from the center of rotation 91 of the eyeball to the vertex pole 92 on the ocular (back) surface of the lens. It is made up of two components; the vertex distance 93, which is the distance between the vertex pole 92 of the lens to the cornea 94 of the eyeball, and the sighting center distance 96, which is the distance between the cornea 94 of the eyeball and the center of rotation 91 of the eyeball. The stop distance has a definite effect on the oblique or marginal errors and enters directly into the calculation of these errors.

It is known in the art that stop distance is not the same for all persons, as was thought at one time. Statistical studies have shown a correlation between stop distance and the prescriptive power required to correct a person's vision. For this reason, each of the power calculations made in arriving at the graphs, of which FIGS. 4 and 5 are representative, is made using the stop distance shown by the statistical studies to be most likely for the particular prescriptive power. FIG. 11 is a table showing vertex distance, sighting center distance and stop distance as statistically determined for a number of powers within the usual range of prescriptive powers. Intermediate values may be determined from this table by interpolation.

Reference has also been made above to pantoscopic tilt and decentering. FIG. 8 shows the lens 61 pantoscopically tilted and the optical axis decentered downwardly about 5 millimeters. This is the approximate desirable position for the wearer, and all efforts in spectacle fitting should be directed toward obtaining this condition. It will be noted that the optical axis 66 of the lens passes through the center of rotation 73 of the eyeball, and that when the wearer is looking 10° below the horizontal 68, he is looking through the vertex 74 of the lens. When the wearer is looking straight ahead and horizontally, he is looking through an area of the lens approximately 10° above the vertex.

In the present design method, calculations for each prescriptive power are made for angles of sight 20°, 30° and 40° from the optical axis, for far vision and for angles of sight 20° and 30° from the optical axis for near vision. The matter of pantoscopic tilt enters into the significance of these angles. For the desirable wearing position, as shown in FIG. 8, the directly forward line of sight 64 is approximately 10° away from the optical axis 66. Thus, even for directly forward vision there are some oblique errors. An upward line of sight of 20° above the horizontal is 30° from the axis, and 30° above the horizontal is 40° from the axis. In the downward direction these effects are reversed. A line of sight 20° below the horizontal is only 10° from the optical axis. For a lateral excursion of the eye, pantoscopic tilt has substantially no effect. The purpose of pantoscopic tilt is to position the lens in front of the eyeball such that the wearer in performing most of his visual tasks will be looking through an area of the lens as near as possible to the vertex where marginal errors are negligible or nonexistant. Studies have shown that the proper amount of pantoscopic tilt is approximately 10°.

A spectacle wearer performs some visual tasks, such as reading and desk work, at angles which, even with pantoscopic tilt of 10°, require him to look through the lens below the decentered vertex. Other tasks are performed at angles which require the wearer to use a portion of the lens considerably above the decentered vertex. In general, however, pantoscopic tilt of approximately 10° provides for greater use of the central area of the lens where the marginal errors are the smallest, thereby providing improved visual acuity for most of the wearer's visual tasks. This, however, does not mean that specific visual tasks can be neglected. Reading, for example, will be performed at angles such that the wearer is looking through an area of the lens approximately 10° below the decentered vertex. The area of the lens used in driving an automobile may range from 20° to even 40° above the decentered vertex. These are appreciable angles and may give rise to sizable marginal errors. This is one of the reasons the design method of the present invention includes calculations at 20°, 30° and 40° from the optical axis, rather than calculations at only one angle, for example 30°, as has long been the practice in the ophthalmic lens art.

Much of the foregoing has been concerned with the effects of marginal or oblique errors upon distance vision. Near vision lens performance is also of concern to the optical designer, and is provided for in the present design method. As is well known, when the eye is focused on a near object, the eye muscles are in a state of accommodation, causing a bulging of the crystalline lens to shorten its focal length and thereby bring near objects into sharp focus on the retina of the eye. In this state of accommodation, the eye is not so limited in the accommodation it can perform as it is when focused on a distant object. As stated above, when the eye is focused on a distant object, the only valid assumption is that the eye is in a state of fully relaxed accommodation, and therefore incapable of accommodating for positive power errors. When focused on a near object, because the eye is in an increased state of accommodation, it may either decrease or increase its state of accommodation, and thereby accommodate for either positive or negative power errors. For this reason, the tangential and sagittal power errors are not especially significant for near vision. Astigmatism, however, is quite significant for near vision.

Statistical studies have shown that for near vision the eye will, to the extent that it is capable, assume a state of accommodation which will bring objects into focus on its retina. When astigmatism is present, the eye is unable to assume a state of accommodation which will bring into focus lines in all planes, so it makes a selection. The studies show that generally the selection will be made to bring into sharp focus lines in the second coordinate plane, or with reference to FIG. 8, the T-line. Thus, when viewing the letter "H" through a marginal area of the lens either above or below the optical axis, the eye would generally focus on the crossmember of the letter, and when viewing the letter "H" through a marginal area of the lens to the right or left of the optical axis, the eye would generally focus on the upright members of the letter.

As stated earlier, accommodation is a complex function which is not fully understood. Although the eyes of the majority of persons tested accommodated to bring the T-line into focus, the eyes of some persons accommodated to bring the S-line into focus, and in a very few cases, the eyes chose a state of accommodation in between that which would have brought the T-line into focus and that which would have brought the S-line into focus. Based upon these studies, the present design method gives more attention to tangential power error than to sagittal power error, and as stated earlier, "power error" means tangential power error.

There is additional support for giving more attention to tangential power errors than to sagittal power errors. One reason is that because of the relationship of the two errors, as can be seen in the S and T-curves of FIGS. 4 and 5, the tangential power error changes more rapidly with lens shape than does the sagittal power error. Therefore, in the areas of interest, the tangential power error is smaller than the sagittal power error. It is reasonable to assume, therefore, that a lesser degree of accommodation will be required for the eye to bring the T-line into focus than would be required to bring the S-line into focus, and that when confronted with a choice, the eye will choose the T-line.

Still another reason for giving more attention to the tangential power error than to the sagittal power error is lateral chromatic aberration. This aberration is the result of prismic color fringing and it cannot be eliminated by changing the shape of the lens. Lateral chromatic aberration, however, affects only lines in the second coordinate plane, or with reference to FIG. 8, the T-line which is the same plane affected by tangential power errors. If the tangential power error and the sagittal power error at a given point in a lens were of equal magnitude, there would be poorer visual acuity for the T-line than for the S-line because of color fringing. Therefore, the present method gives more attention to tangential than to sagittal power errors.

Referring now to FIG. 12, there is a graph showing the S and T-curves for near vision for +4.00D spherical prescriptive power lenses having convex curves ranging from +6.00D to +12.00D. For the lens having a +7.00D convex curve (indicated by the vertical line 97) there is a tangential power error of approximately +0.02D, a sagittal power error of approximately −0.08D, and astigmatism of approximately 0.10D. Based upon the present design method, the eye of a wearer of this lens would accommodate to bring the T-line into focus. To do so, the eye must overcome the +0.02D tangential power error, a value well within the capability of the eye. When the eye accommodates for the power error, the effect is similar to shifting the horizontal axis of the graph to the position of the line 98, so that the effective tangential power error is zero. So long as the absolute power error is within the eye's ability to accommodate, only the astigmatic error is significant. Therefore, the S and T-curves may be replaced with a single curve, denominated the A curve in FIG. 13, which shows the amount of astigmatism for each shape lens graphed in FIG. 12. Replacing the S and T-curves with the A curve not only emphasizes the variation of astigmatism with lens shape, but also permits graphing the astigmatism in both the sphere and cylinder meridians of a toric lens on the same graph without unduly cluttering the graph with two sets of S and T-curves.

In the application of the present method to the design of a complete ophthalmic lens series, calculations are made and graphs constructed for many prescriptive powers, both spherical and cylindrical. Each of these calculations are made for the conditions discussed above; angles of sight, pantoscopic tilt, object distance, variations in stop distance. For cylindrical lenses, the calculations are made in each major meridian. Various near distances have been considered and it has been found that calculations based upon a near distance of 14 inches are useful in showing the effects of marginal errors within the near vision range.

Figure 14:
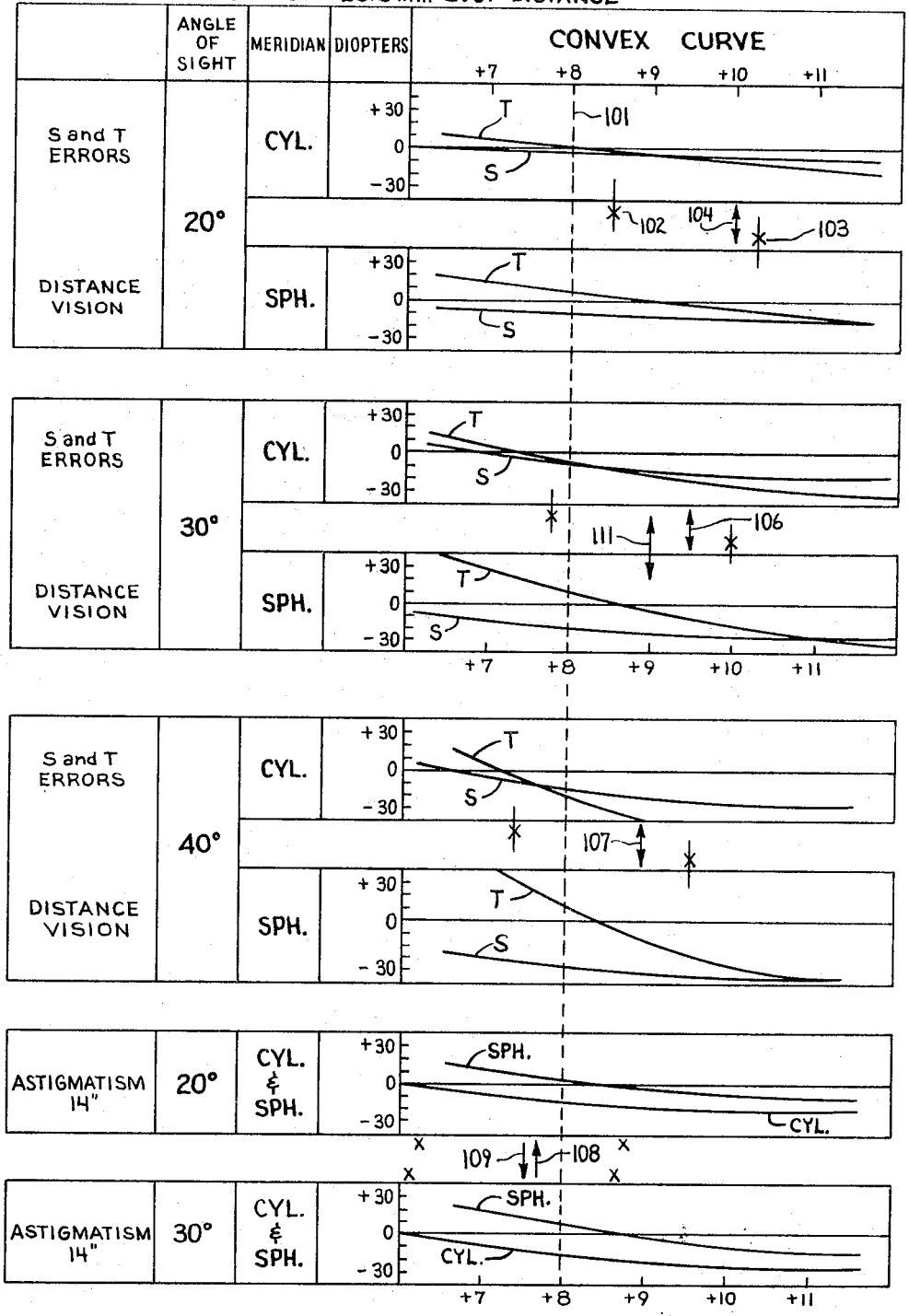
FIG. 14 is a set of graphs showing the tangential, sagittal, and astigmatic errors for various angles of viewing and for near and distance vision.

Reference is now made to FIG. 14 for an understanding of the full design routine. FIG. 14 shows a set of graphs for one prescriptive power, in this case, a +4.00D sphere combined with a −1.00D cylinder. Separate graphs are shown for distance vision at visual angles of 20°, 30° and 40° from the optical axis and in each case for the two principal meridians of the lens, that is, the sphere and cylinder meridians. Also, as a part of this complete set are individual graphs of astigmatism for near vision at 14 inches for both 20° and 30° from the optical axis. It will be noted that the scale along the horizontal axis is identical for each of the graphs of FIG. 14. All of the curves could have been constructed on one graph, but to do so could only result in confusion and make it quite difficult to visualize how the several errors varied with base curve shape. For example, the vertical line 101 passing through all of the graphs of FIG. 14 and intersecting the various S, T and A curves readily shows the tangential, sagittal and astigmatic errors for a lens of +4.00D, −1.00D prescriptive power having a base convex curve of +8.00D. The user of this set of graphs can easily visualize how the various errors will change as the lens shape is made flatter or more curved.

It will be noted that in each of the graphs shown the errors have been plotted against the convex curve values, but as stated earlier, they might also be plotted against the values of the cylinder meridian concave curves or the sphere meridian concave curves. Selection of one characteristic curve for a given prescriptive power lens determines the other characteristic curves for that prescriptive power. Therefore, wherever this specification states that errors are plotted against the base curves, this should be taken to mean any of the characteristic curves.

All of the graphs of FIG. 14 are considered simultaneously in making the final base curve selection, but first each of the graphs is considered separately in a manner similar to that outlined above for graphs of FIGS. 4 and 5 each meridian being treated separately. For the top graph of FIG. 14 for distance vision at 20° from the optical axis in the cylinder meridian, a preliminary choice is made at a +8.50D convex curve and a small ×(102) is made at this curve value just below the graph. For the sphere meridian graph for distance vision at 20° from the optical axis a a +10.25D convex curve is the temporary choice, and an ×(103) is made at this point just above this graph. These two values are now balanced to arrive at a +10.00D convex curve as the optimum shape for both the sphere and cylinder meridians for distance vision at 20° from the optical axis and a double-headed arrow (104) is made at the +10.00D curve value. It will be noted that +10.00D is not halfway between +10.25D and +8.50D, but closer to the sphere meridian selection as the errors are changing more rapidly in the sphere meridian than in the cylinder meridian. This illustrates again the advantage of the present graphical method wherein the user can see exactly how the error values vary as the shape of the lens is varied.

Proceeding in the manner described for the 20° graph, points are selected for the 30° and 40° graphs and double-headed arrows (106) and (107) placed accordingly. For near vision, the S and T curves are replaced with A curves for both the sphere and cylinder meridians. Where an A curve crosses the axis, there is no astigmatism. But it will be seen that the A curves for the sphere and cylinder meridians do not cross the axis at the same point, and therefore a balance must be struck between them. In this case the balance is struck at a point where the residual astigmatism is approximately the same for the sphere and cylinder meridians, and single headed arrows (108) an (109) placed accordingly. In other cases it may be more desirable to favor the astigmatic error curve which is changing more rapidly.

There is now a series of arrows stepped off vertically, each arrow indicating the convex curve of the lens shape which optimizes visual acuity for the particular vision (near or far) and area of the lens (20°, 30° or 40° from the optical axis). It will be seen that from top to bottom of FIG. 14 the arrows (104, 106, 107, 108 and 109) progress to the left, toward a flatter shape lens. Whatever weight is given to near vision will especially shift the curve selection to the left and therefore result in a flatter lens shape. Generally, a tentative selection is made for distance vision and the amount of astigmatism this selection will introduce in near vision is noted. If this value is small, as is usually the case, only a comparatively small further shift is made to the left. Proceeding in this way a final selection for this power is made at +9.00D convex curve, which is indicated by the longer double-headed arrow (111) near the middle of FIG. 14.

The above-described procedure is used for a large number of prescriptive powers spaced over the entire range of prescriptive powers. Then, using a large number of graphs, each covering a comparatively short span of powers, a complete working layout is made of the entire lens series.

FIGS. 15A and 15B are a single table defining a representative layout comprising 20 groups of prescriptive powers, each with its own base curve. The groups are separated by heavy lines and the nominal power of the base curve for each group is printed in large numerals within the boundaries of the group to which it applies. The base curves in this particular design layout are spherical curves on the convex side of the lenses, the necessary spheres and cylinders to provide the particular prescriptive powers being on the concave side of the lenses. As noted above, this series would be termed a minus cylinder layout because the cylinder is on the concave side, but the design method of the present invention is equally applicable in the design of a plus cylinder layout. In fact, it may be used to design a lens series having plus cylinders for certain prescriptive powers and minus cylinders for other prescriptive powers.

From the foregoing description it will be seen that the present invention provides a comprehensive graphical method for designing ophthalmic lenses having optimum visual acuity in all areas, consideration being given to tangential and sagittal power errors, errors of astigmatism, distance vision, near vision, usual visual tasks of the spectacle wearer, and the ability of the eye to accommodate for certain power errors. It will be further seen that the present invention provides a graphical method for selecting the proper combination of optical curves to provide optimum visual acuity for a single prescriptive power, and also for arranging numbers of prescriptive powers in groups, all of the prescriptive powers of a group being provided by lenses having a common base curve. The present invention further provides an improved ophthalmic lens series having improved visual acuity in all areas of the lenses of the series at oblique angles up to 40° from the optical axis and covering the usual range of prescriptive powers with only twenty groups, each group having a common base curve.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention and the scope of the claims are also desired to be protected. For example, a factor different from 70 percent may be applied to astigmatic errors as compared to power errors, or a distance other than 14 inches may be used in the near vision calculations, or the number of groups in the lens series covering a given range of prescriptive powers may vary without departing from the spirit of the invention and the scope of the claims.

What is claimed is:

1. A minus cylinder ophthalmic lens series comprising lenses formed of a transparent material of known refractive index and providing a plurality of predetermined spherical prescriptive powers within a range of −8.00D and +6.50D and a plurality of predetermined cylindrical prescriptive powers within a range of 0.00D to −6.00D, each of said lenses having disposed upon one surface thereof a convex curve having a spherical dioptric power as indicated for each combination of spherical and cylindrical prescriptive powers in the table of FIGS. 15A and 15B.

* * * * *